(12) United States Patent
Hofmann et al.

(10) Patent No.: US 11,225,584 B2
(45) Date of Patent: *Jan. 18, 2022

(54) ADHESION PROMOTER SYSTEM, AND METHOD OF PRODUCING THE SAME

(75) Inventors: Sandra Hofmann, Einsiedeln (CH); Bart Noordover, Waedenswil (CH); Cristiano Betté, Richterswill (CH); Antonio Batistini, Wangen (CH); Elisa Passaglia, Pisa (IT); H. Craig Silvis, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/697,262

(22) PCT Filed: Apr. 20, 2011

(86) PCT No.: PCT/US2011/033242
§ 371 (c)(1),
(2), (4) Date: Nov. 9, 2012

(87) PCT Pub. No.: WO2011/142948
PCT Pub. Date: Nov. 17, 2011

(65) Prior Publication Data
US 2013/0059163 A1    Mar. 7, 2013

Related U.S. Application Data

(60) Provisional application No. 61/332,992, filed on May 10, 2010.

(51) Int. Cl.
*C09D 123/26* (2006.01)
*C09D 123/02* (2006.01)
*C09J 123/02* (2006.01)

(52) U.S. Cl.
CPC .......... *C09D 123/02* (2013.01); *C09J 123/02* (2013.01); *C08L 2205/02* (2013.01); *C08L 2666/24* (2013.01); *Y10T 428/31938* (2015.04)

(58) Field of Classification Search
CPC ............. C08L 2201/56; C08L 2666/24; C08L 2205/02; C09J 123/02; C09D 123/02; Y10T 428/31938
See application file for complete search history.

(56) References Cited

U.S. PATENT DOCUMENTS 2,124,235 A * 7/1938 Werner et al. ................. 428/441
4,822,688 A * 4/1989 Nogues ......................... 428/458
(Continued)

FOREIGN PATENT DOCUMENTS

EP    1837350 A1    9/2007
JP    11-256095     9/1999
(Continued)

OTHER PUBLICATIONS

PCT/US2011/033242,; International Search Report/Written Opinion of the International Searching Authority..
(Continued)

*Primary Examiner* — Samir Shah
(74) *Attorney, Agent, or Firm* — Karl E. Stauss; Hammer & Associates

(57) ABSTRACT

Adhesion promoter systems and methods of producing same, the systems including the admixing product of at least 60 percent by weight of a first functionalized polyolefin, and less than 40 percent by weight of a second functionalized polyolefin, based on the total weight of the solid content, and one or more solvents. The second functionalized polyolefin includes homopolymers of propylene or copolymers of propylene with hexene, octene and/or other alpha-olefins. The homopolymers or copolymers have a single unsatura-
(Continued)

tion a terminal succinic anhydride moiety, and additional succinic anhydride substitutions on the polypropylene backbone. The succinic anhydride substitution ranges from about 5 to about 45 weight percent of second functionalized polyolefin.

7 Claims, 5 Drawing Sheets

(56) References Cited

U.S. PATENT DOCUMENTS

| | | | |
|---|---|---|---|
| 5,362,788 A | 11/1994 | Kimura et al. | |
| 5,373,048 A | 12/1994 | Witzeman et al. | |
| 5,534,577 A | 7/1996 | Namba et al. | |
| 5,709,946 A | 1/1998 | Jackson et al. | |
| 5,728,767 A | 3/1998 | Kanetou et al. | |
| 5,759,703 A | 6/1998 | Neymark et al. | |
| 6,084,029 A * | 7/2000 | McGee | 525/66 |
| 6,767,948 B1 * | 7/2004 | Jing | 524/367 |
| 6,822,019 B2 * | 11/2004 | Lin et al. | 523/216 |
| 8,981,013 B2 | 3/2015 | Silvis et al. | |
| 2004/0176541 A1 * | 9/2004 | Jackson et al. | 525/192 |
| 2004/0220320 A1 * | 11/2004 | Abhari et al. | 524/487 |
| 2004/0220336 A1 * | 11/2004 | Abhari | C08F 255/00 525/70 |
| 2004/0249046 A1 * | 12/2004 | Abhari | C09J 123/10 524/474 |
| 2005/0100754 A1 * | 5/2005 | Moncla et al. | 428/523 |
| 2005/0271882 A1 | 12/2005 | Walther et al. | |
| 2006/0084764 A1 * | 4/2006 | Hanna et al. | 525/242 |
| 2007/0149712 A1 * | 6/2007 | Chaudhary et al. | 525/244 |
| 2008/0207845 A1 * | 8/2008 | Ashiura et al. | 525/452 |
| 2008/0207945 A1 | 8/2008 | Dee-Noor et al. | |
| 2010/0059178 A1 * | 3/2010 | Jiang et al. | 156/311 |
| 2010/0143651 A1 * | 6/2010 | Silvis et al. | 428/141 |

FOREIGN PATENT DOCUMENTS

| | | | |
|---|---|---|---|
| JP | 2001-131367 | 5/2001 | |
| WO | WO97/22471 | 6/1997 | |
| WO | 2008/079784 A2 | 7/2008 | |
| WO | WO2008/085238 | 7/2008 | |
| WO | WO 2008079784 A2 * | 7/2008 | |
| WO | WO-2009097410 A1 * | 8/2009 | C08L 23/10 |

OTHER PUBLICATIONS

PCT/US2011/033242, International Preliminary Report on Patentability.

Japanese Office Action dated Nov. 7, 2014; from Japanese counterpart Application No. 2013-510111.
Chinese Response to Office Action dated Dec. 11, 2014; from Chinese counterpart Application No. 201180034026.2.
Chinese Office Action dated Aug. 1, 2014I from Chinese counterpart Application No. 201180034026.2.
Chinese Office Action dated Mar. 13, 2015; from Chinese counterpart Application No. 201180034026.2.
Chinese Response to office action dated May 28, 2015; from Chinese counterpart Application No. 201180034026.2.
Japanese Response to Office Action dated Apr. 3, 2015; from Japanese counterpart Application No. 2013-510111.
EP Office Action received Nov. 14, 2016; from EP counterpart Application No. 11717142.1.
Chinese Office Action received Oct. 13, 2016; from Chinese counterpart Application No. 201180034026.2.
Canadian Office Action dated received Sep. 14, 2017; from Canadian counterpart Application No. 2,798,021.
Canadian Office Action received Jan. 19, 2017; from counterpart Canadian Application No. 2,798,021.
Japanese Divisional Office Action received May 30, 2017; from Japanese Divisional counterpart Application No. 2016-042180.
Korean Office Action dated received Sep. 21, 2017; from Korean counterpart Application No. 10-2012-7032090.
EP Divisional Office Action received May 4, 2018; from counterpart EP Divisional Application No. 17202616.3.
EP Divisonal Extended Search Report dated Feb. 5, 2018; from EP Divisional counterpart Application No. 17202616.3.
Chinese Divisional Office Action dated received May 31, 2018; from Chinese Divisional counterpart Application No. 201710188679.5.
Japanese Office Action dated Nov. 5, 2015; from Japanese counterpart Application No. 2013-510111.
Chinese Response to Office Action dated Dec. 6, 2015; from Chinese counterpart Application No. 201180034026.2.
Canadian Office Action dated received Jul. 19, 2018; from Canadian counterpart Application No. 2,798,021.
Chinese Divisional Office Action dated received Feb. 13, 2019; from Chinese Divisional counterpart Application 201710135086.2.
Chinese Divisional Office Action dated received Jun. 4, 2019; from Chinese Divisional counterpart Application No. 201710135086.2.
Chinese Divisional Office Action received Dec. 26, 2018; from counterpart Chinese Divisional Application No. 201710188679.5.
EP Divisional Office Action dated received Sep. 24, 2019; from EP Divisional counterpart Application No. 17202616.3.
Chinese Third Office Action dated Oct. 23, 2015; from Chinese counterpart Application No. 201180034026.2.

* cited by examiner

ADHESION PROMOTER SYSTEM, AND METHOD OF PRODUCING THE SAME

CROSS-REFERENCE TO RELATED APPLICATIONS

This application is a non-provisional application claiming priority from the U.S. Provisional Patent Application No. 61/332,992 filed on May 10, 2010 entitled "ADHESION PROMOTER SYSTEM, AND METHOD OF PRODUCING THE SAME," the teachings of which are incorporated by reference herein, as if reproduced in full hereinbelow.

FIELD OF INVENTION

The instant invention relates to an adhesion promoter system, and method of producing the same.

BACKGROUND OF THE INVENTION

Different techniques have been employed to facilitate the paintability of certain low surface energy plastic substrates such as thermoplastic polyolefins ("TPO"). Such techniques have, for example, largely been employed in the automotive industry such as automotive exterior painting applications, e.g. car bumpers, and automotive interior painting applications, e.g. instrument panels. Furthermore, there are a number of additional non-automotive applications, which require good adhesion of a topcoat to polypropylene substrates, for example, packaging applications, geotextile applications, aquaculture, sporting goods, appliances, consumer electronics, furniture, marine, roofing membranes and toys.

Adhesion promoters can also be employed as a sizing agent for glass fibers used in producing glass fiber reinforced polypropylene or TPO or to provide for adhesion between natural fibers and a PP or TPO substrate to enable reinforcement.

Typically, an adhesion promoter is employed to enhance the adhesion properties between different layers. Such adhesion layers may be applied as a separate layer, a formulated primer layer, or a blend component in a basecoat or primer formulation. The coatings applied can be solvent-based or waterborne; however, in the latter case, typically at least some surface activation treatment is required, for example, flame treatment, plasma treatment, or corona treatment. For solvent-based systems the key unmet needs is to provide for a low cost material with chlorine-free being regarded as a benefit.

Currently available solvent based options fail to address all of the concerns associated with coating applications of TPO and/or PP substrates. For example, the currently available options fail to address concerns associated with chlorine containing adhesion promoter formulations.

Despite the research efforts in producing improved adhesion promoter formulation, there is still a need for a chlorine free adhesion promoter system with improved properties; and furthermore, there is still a need for a method for making such chlorine free adhesion promoter systems with improved properties at reduced costs. The adhesion promoter systems of the present invention provide chlorine free adhesion promoter systems with improved adhesion properties without interfering with other properties.

SUMMARY OF THE INVENTION

The instant invention is an adhesion promoter system, and method of producing the same.

In one embodiment, the instant invention provides an adhesion promoter system comprising the admixing product of: (a) at least 60 percent by weight of a first functionalized polyolefin, based on the total weight of the solid content; (b) less than 40 percent by weight of a second functionalized polyolefin, based on the total weight of the solid content, wherein said second functionalized polyolefin comprises homopolymers of propylene or copolymers of propylene with hexene, octene and/or other like alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 weight percent of second functionalized polyolefin; (c) in the presence of one or more solvents, for example, at a temperature in the range of from 25° C. to 120° C.

In an alternative embodiment, the instant invention further provides a method for producing an adhesion promoter system comprising the steps of: (1) selecting at least 60 percent by weight of a first functionalized polyolefin, based on the total weight of the solid content; (2) selecting less than 40 percent by weight of a second functionalized polyolefin, based on the total weight of the solid content, wherein said second functionalized polyolefin comprise homopolymers of propylene or copolymers of propylene with hexene, octene and/or other like alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 weight percent of second functionalized polyolefin; (3) admixing said first functionalized polyolefin and said second functionalized polyolefin in the presence of one or more solvents; and (4) thereby forming said adhesion promoter system.

In another alternative embodiment, the instant invention further provides an adhesion layer comprising a film derived from the adhesion promoter system according with any of the preceding embodiments.

In another alternative embodiment, the instant invention further provides a multilayer structure comprising: (a) at least one or more substrate layers; (b) at least one or more adhesion layers, wherein said one or more adhesion layers comprise a film derived from the adhesion promoter system according with any of the preceding embodiments; (c) at least one or more outer layers; wherein said adhesion layer is disposed therebetween said one or more substrate layers and said one or more outer layers.

In another alternative embodiment, the instant invention further provides a process for making a multilayer structure comprising the steps: (1) selecting a at least one or more substrate layers; (2) selecting the adhesion promoter system according with any of the preceding embodiments; (3) applying said adhesion promoter system to at least one surface of said substrate layer; (4) removing at least a portion of the solvent; (5) thereby forming an adhesion layer associated with said substrate layer; (6) forming at least one or more outer layers on said adhesion layer; and (7) thereby forming a multilayer structure.

In an alternative embodiment, the instant invention provides a composition, method of producing the same, articles made therefrom, and method of making such articles, in accordance with any of the preceding embodiments, except that the adhesion promoter system further comprises one or more fillers, one or more binders, one or more pigments, one or more film forming aids, one or more crosslinking agents, one or more conductivity enhancer agents, one or more rheology modifying agents, In another alternative embodiment, the instant invention further provides a coating formulation comprising at least the adhesion promoter system, as described hereinabove.

In another alternative embodiment, the instant invention further provides a coating layer comprising a film derived from the coating formulation, as described hereinabove.

In another alternative embodiment, the instant invention further provides a multilayer structure comprising: (a) at least one or more substrate layers; (b) at least one or more coating layers comprising a film derived from the coating formulation, as described hereinabove; and (c) optionally one or more outer layers.

In an alternative embodiment, the instant invention provides a composition, method of producing the same, articles made therefrom, and method of making such articles, in accordance with any of the preceding embodiments, except that the functionalized polymer composition is obtained by a process comprising (a) reacting a propylene/hexene copolymer having a terminal unsaturation with maleic anhydride in a mole ratio of 1:1 to produce terminally succinic anhydride functionalized propylene/hexene copolymer having a terminal succinic anhydride moiety and a single unsaturation, and then (b) reacting the terminally succinic anhydride functionalized propylene/hexene copolymer having a terminal succinic anhydride moiety and a single unsaturation with additional maleic anhydride in the presence of free radical initiation to produce said functionalized polymer composition, wherein said functionalized polymer composition has a succinic anhydride substitution in the range of from 5 to 45 weight percent, based on the weight of functionalized polymer composition.

In another alternative embodiment, the instant invention further provides a process for making a multilayer structure comprising the steps: (1) selecting a at least one or more substrate layers; (2) selecting a coating formulation, as described hereinabove; (3) applying said coating formulation to at least one surface of said substrate layer; (4) removing at least a portion of the solvent; (5) thereby forming a coating layer associated with said substrate layer; (6) optionally forming one or more outer layers on said coating layer; and (7) thereby forming a multilayer structure.

In an alternative embodiment, the instant invention provides a composition, method of producing the same, articles made therefrom, and method of making such articles, in accordance with any of the preceding embodiments, except that first functionalized polyolefin comprises a propylene/ethylene copolymer having a crystallinity in the range of from 1 percent by weight to 30 percent by weight, a heat of fusion in the range of from 2 Joules/gram to 50 Joules/gram), and a DSC melting point in the range of 25° C. to 110° C.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
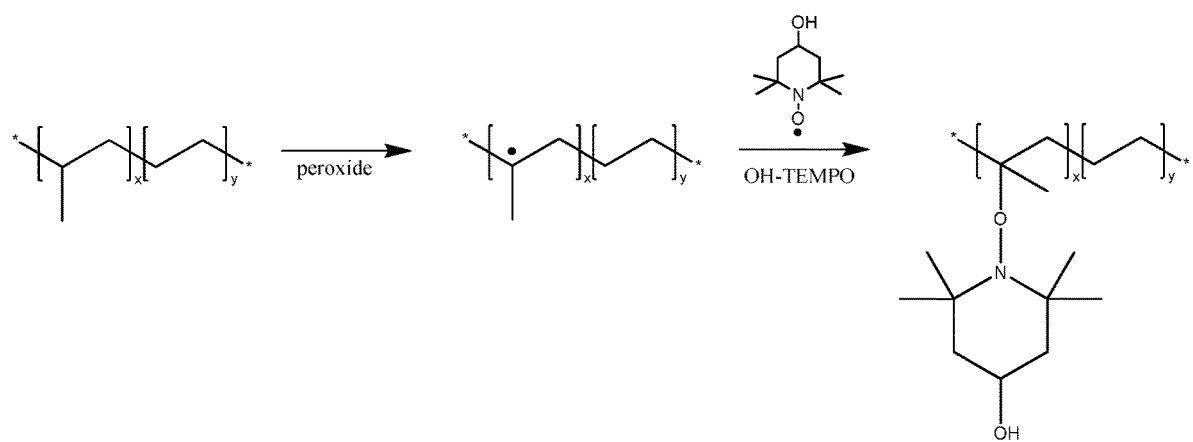
FIG. 1 illustrates functionalization of propylene-co-ethylene polymers through peroxide initiated grafting of 4-hydroxy TEMPO.

The instant invention is an adhesion promoter system, and method of producing the same.

In one embodiment, the instant invention provides an adhesion promoter system comprising the admixing product of: (a) at least 60 percent by weight of a first functionalized polyolefin, based on the total weight of the solid content; (b) less than 40 percent by weight of a second functionalized polyolefin, based on the total weight of the solid content, wherein said second functionalized polyolefin comprise homopolymers of propylene or copolymers of propylene with hexene, octene and/or other like alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 weight percent of second functionalized polyolefin; (c) in the presence of one or more solvents.

The adhesion promoter system may comprise at least 20 percent by weight of the admixture, based on the weight of the adhesion promoter system. All individual values and subranges from at least 20 weight percent are included herein and disclosed herein; for example, the adhesion promoter system may comprise at least 30 percent by weight of the admixture, based on the weight of the adhesion promoter system; or in the alternative, the adhesion promoter system may comprise at least 40 percent by weight of the admixture, based on the weight of the adhesion promoter system; or in the alternative, the adhesion promoter system may comprise at least 50 percent by weight of the admixture, based on the weight of the adhesion promoter system; or in the alternative, the adhesion promoter system may comprise at least 55 percent by weight of the admixture, based on the weight of the adhesion promoter system; or in the alternative, the adhesion promoter system may comprise at least 65 percent by weight of the admixture, based on the weight of the adhesion promoter system; or in the alternative, the adhesion promoter system may comprise at least 75 percent by weight of the admixture, based on the weight of the adhesion promoter system.

The adhesion promoter system may further comprise one or more fillers, one or more binders, one or more pigments, one or more film forming aids, one or more crosslinking agents, one or more conductivity enhancer agents, one or more rheology modifying agents, The adhesion promoter system may be applied to the surface of a substrate as a separate layer or it may be incorporated into a coating system.

The admixture may comprise from at least 60 percent by weight of a first functionalized polyolefin, as described hereinbelow in further details, based on the total weight of the solid. All individual values and subranges from at least 60 weight percent are included herein and disclosed herein; for example, the weight percent of the first functionalized polyolefin can be from a lower limit of 60, 70, 75, 80, 85, 90, or 95 weight percent to an upper limit of 70, 75, 80, 85, 90, 95 or 100 weight percent. For example, the admixture may comprise from 60 to 95 percent, or 70 to 90 percent, or 75 to 95 percent, or 80 to 99 percent, or 85 to 99 percent, or 90 to 100 percent by weight of the first functionalized polyolefin, based on the total weight of the solid content.

The admixture may comprise from less than 40 percent by weight of a second functionalized polyolefin, as described hereinbelow in further details, based on the total weight of the solid. All individual values and subranges from less than 40 weight percent are included herein and disclosed herein; for example, the weight percent of the second functionalized polyolefin can be from a lower limit of 0, 5, 10, 15, 20, 30, or 35 weight percent to an upper limit of 5, 10, 15, 20, 30, or 40 weight percent. For example, the admixture may comprise from 0 to 35 percent, or 0 to 30 percent, or 0 to 25 percent, or 0 to 15 percent, or 5 to 15 percent, or 0 to 10 percent by weight of the second functionalized polyolefin, based on the total weight of the solid content.

The admixture may comprise at least 5 percent by weight of solid content, excluding the weight of any filler, based on the total weight of the admixture. All individual values and subranges of at least 5 weight percent are included herein and disclosed herein; for example, the weight percent can be from a lower limit of 5, 10, 20, 30, 40, 50, 55, 60, 65, 70, 75, or 80 weight percent to an upper limit of 45, 50, 55, 60, 65, 70, 75, 80 or 85 weight percent. For example, the admixture may comprise at least 10 percent, or at least 20 percent, or at least 30 percent, or at least 40 percent, or at least 45 percent, or at least 50 percent, or at least 55 percent, or at least 60 percent, or at least 65 percent, or at least 70 percent by weight of solid content, excluding the weight of any filler, based on the total weight of the admixture.

(1) First Functionalized Polyolefin

In one embodiment the first functionalized polyolefin may be an amine and/or hydroxyl functionalized polyolefin prepared via an in-situ melt reaction. In one another embodiment, the preparation of the functionalized polyolefin takes place in a batch reactor. In another embodiment, the preparation takes place in a reactive extrusion process. In the alternative, the first functionalized polyolefin may be a polyolefin grafted with 2,2,6,6-tetramethylpiperidinyloxy nitroxide (TEMPO) and/or derivatives thereof such as 4-Hydroxy-TEMPO or 4-amino-TEMPO The first functionalized polyolefin may be prepared via a process comprising the following steps:
A) grafting onto the backbone of a polyolefin at least one compound comprising at least one "amine-reactive" group to form a grafted polyolefin;
B) reacting a primary-secondary diamine with the grafted polyolefin; and wherein step B) takes place subsequent to step A), without the isolation of the grafted polyolefin, and wherein both steps A) and B) take place in a melt reaction.

In an alternative embodiment, the primary-secondary diamine is selected from the group consisting of N-ethylethylenediamine, N-phenylethylenediamine, N-phenyl-1,2-phenylene-diamine, N-phenyl-1,4-phenylenediamine, or 4-(aminomethyl)piperidine, or 1,2-diamino-2-methyl-propane.

In one embodiment, both steps A and B take place in a batch reactor.

In another embodiment, both steps A and B take place in a Brabender mixer, a Buss mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another embodiment, the first functionalized polyolefin is produced via a process comprising the following steps:
A) grafting onto the backbone of a polyolefin at least one compound comprising at least one "amine-reactive" group to form a grafted polyolefin;
B) reacting a alkanolamine with the grafted polyolefin; and wherein step B) takes place subsequent to step A), without the isolation of the grafted polyolefin, and wherein both steps A) and B) take place in a melt reaction.

In a preferred embodiment, the alkanolamine is selected from 2-aminoethanol, 2-amino-1-propanol, 3-amino-1-propanol, 2-amino-1-butanol, 2-(2-aminoethoxy)-ethanol or 2-aminobenzyl alcohol.

In one embodiment, both steps A and B take place in a batch reactor.

In another embodiment, both steps A and B take place in a Brabender mixer, a Busch mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another embodiment, the first functionalized polyolefin is produced according to the process comprising the following steps:
A) grafting onto the backbone of a polyolefin at least one compound comprising at least one "amine-reactive" group to form a grafted polyolefin;
B) reacting a primary-secondary diamine or an alkanolamine with the grafted polyolefin; and wherein step B) takes place subsequent to step A), without the isolation of the grafted polyolefin, and wherein both steps A) and B) take place in a melt reaction.

In an alternative embodiment, the primary-secondary diamine is selected from the group consisting of N-ethylethylenediamine, N-phenylethylenediamine, N-phenyl-1,2-phenylene-diamine, N-phenyl-1,4-phenylenediamine, 1,2-diamino-2-methyl-propane or 4-(aminomethyl)piperidine.

In another alternative embodiment, the alkanolamine is selected from group consisting of 2-aminoethanol, 2-amino-1-propanol, 3-amino-1-propanol, 2-amino-1-butanol, 2-(2-aminoethoxy)-ethanol or 2-aminobenzyl alcohol.

In one embodiment, both steps A and B take place in a batch reactor.

In another embodiment, both steps A and B take place in a Brabender mixer, a Busch mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another embodiment, the first functionalized polyolefin is an imide functionalized polyolefin prepared via a process comprising the following steps:

grafting onto the backbone of a polyolefin, in a melt reaction, at least one compound of the following formula (IV) to form a grafted polyolefin:

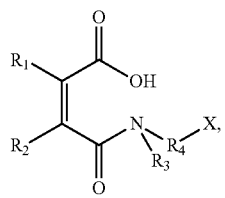

(IV)

and thermally treating the grafted polyolefin to form the imide functionalized polyolefin, and wherein R1 and R2 are, independently, either hydrogen or a C1-C20 hydrocarbyl radical, which is linear or branched; R3 is hydrogen or a C1-C20 hydrocarbyl radical, which is linear or branched; R4 is a hydrocarbyl di-radical, which is linear or branched; X is OH or $NHR_5$, where R5 is a hydrocarbyl radical, which is linear or branched, or a hydroxyethyl group.

In another embodiment, the first functionalized polyolefin is imide functionalized polyolefin produced via a process comprising the following steps:
A) functionalizing the polyolefin with at least one compound comprising at least one "amine-reactive" group to form a grafted polyolefin;
B) blending the grafted polyolefin, in a solid, non-molten form, with at least one primary-secondary diamine;
C) imbibing the primary-secondary diamine into the grafted polyolefin;
D) reacting the primary-secondary diamine with the grafted polyolefin to form an imide functionalized polyolefin.

In a further embodiment, the imbibing step takes place at room temperature. In another embodiment, the blending step takes place at room temperature.

In another embodiment of the invention, the polyolefin is an ethylene-based polymer. In another embodiment, the ethylene-based polymer is a random ethylene-based interpolymer, wherein one or more comonomers are randomly distributed within the polymer chains.

In another embodiment, the ethylene-base polymer is an ethylene/α-olefin interpolymer, and wherein the α-olefin is a $C_3$-$C_{20}$ α-olefin. In another embodiment, the α-olefin is randomly distributed within the polymer chains. In another embodiment, the α-olefin is selected from 1-propene, 1-butene, 1-hexene, and 1-octene, and mixtures thereof.

In another embodiment, the polyolefin is a propylene-based polymer. In another embodiment, the propylene-based polymer is a random propylene-based interpolymer, wherein one or more comonomers are randomly distributed within the polymer chains.

In another embodiment, the propylene-base polymer is a propylene/ethylene interpolymer or a propylene/α-olefin interpolymer, and wherein the α-olefin is a $C_4$-$C_{20}$ α-olefin. In another embodiment, the propylene-base polymer is a propylene/ethylene interpolymer. In another embodiment, the ethylene is randomly distributed within the polymer chains. In another embodiment, the propylene-base polymer is a propylene/α-olefin interpolymer, and wherein the α-olefin is a $C_4$-$C_{20}$ α-olefin. In another embodiment, the α-olefin is randomly distributed within the polymer chains. In another embodiment, the α-olefin is selected from 1-butene, 1-hexene or 1-octene.

The first functionalized polyolefin may be prepared via a combination of two or more embodiments as described herein.

I. In-Situ Functionalization Reactions Using of a Grafted Polyolefin to Produce the First Functionalized Polyolefin a) Grafting Reactions The polyolefins disclosed herein may be modified by typical grafting, hydrogenation, nitrene insertion, epoxidation, or other modification reactions, well known to those skilled in the art. Preferred modifications are grafting reactions using a free radical mechanism, and more preferably, grafting reactions that result in the formation of "amine-reactive groups" and "hydroxyl-reactive groups." Such groups include, but are not limited to, anhydride groups, ester groups and carboxylic acid groups, and preferably the reactive group is an anhydride group.

Examples of reactive compounds that can be grafted onto the polymeric hydrocarbon backbone include ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes, such as glycidyl acrylate, glycidyl methacrylate, and glycidyl ethacrylate. Preferred ethylenically unsaturated amine-reactive compounds include maleic anhydride, acrylic acid, methacrylic acid, glycidyl acrylate, glycidyl methacrylate, with maleic anhydride being more preferred. Polypropylene grafted with maleic anhydride is a more preferred modified polymeric hydrocarbon.

With regard to the first functionalized polyolefin, the degree of incorporation or grafting of the reactive group is "application dependent," but is preferably not more than 10 weight percent, more preferably not more than 5 weight percent, more preferably not more than 2 weight percent, and most preferably not more than 1 weight percent; and preferably not less than 0.01 weight percent, more preferably not less than 0.1 weight percent, and most preferably not less than 0.2 weight percent, based on the weight of the grafting agent.

A thermal grafting process is one method for reaction; however, other grafting processes may be used, such as photo initiation, including different forms of radiation, e-beam, or redox radical generation. The functionalization may also occur at the terminal unsaturated group (e.g., vinyl group) or an internal unsaturation group, when such groups are present in the polymer.

In accordance with some embodiments, the polymers with unsaturation are functionalized, for example, with carboxylic acid producing moieties (preferably acid or anhydride moieties) selectively at sites of carbon-to-carbon unsaturation on the polymer chains, preferably in the presence of a free-radical initiator, to randomly attach carboxylic acid producing moieties, i.e., acid or anhydride or acid ester moieties, onto the polymer chains.

The amine-reactive group or hydroxyl-reactive group can be grafted to the polymer by any conventional method, typically in the presence of a free radical initiator, for example peroxides and azo compounds, or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

The grafting reaction should be performed under conditions that maximize grafts onto the polyolefin backbone, and minimize side reactions, such as the homopolymerization of the grafting agent, which is not grafted to the polyolefin. The grafting reaction may be performed in the melt, in solution, in the solid-state, in a swollen-state, and is preferably performed in the melt. The grafting reaction may be performed in a wide-variety of equipment, such as, but not limited to, twin screw extruders, single screw extruders, Brabender mixers, and batch reactors.

Mixing the polyolefin with the grafting agent and initiator in the first stage of an extruder, at melt temperatures typically from 120° C. to 260° C., preferably from 130° C. to 250° C., produces sufficiently grafted polymers. All individual temperature values and ranges from 120° C. to 260° C. are included herein and disclosed herein.

b) In-Situ Amine Functionalization and In-Situ Hydroxyl Functionalization

The process to produce amino-functionalize or hydroxy-functionalize polyolefin can be carried out as one extrusion step, i.e. maleic anhydride can be grafted to the polyolefin in the first section of the extruder, followed by imidization with either a primary-secondary diamine or alkanolamine in the latter section before pelletization.

Alternatively, two extruders, or melt mixing devises could be operated in series to carry out both chemical steps.

In order to prepare an amino-functionalized polyolefin, without competing crosslinking reactions, in the melt, from anhydride-grafted polyolefin, it is necessary to employ a primary-secondary diamine of the general formula $H_2N$—R—NH—R", where R is at least a $C_2$ hydrocarbyl radical. The diamine can be used in a stoichiometric excess or stoichiometric equivalence.

Suitable primary-secondary diamines include compounds of structure (I) below:

$$H_2N-R_1-NH-R_2 \qquad (I)$$

In structure (I), $R_1$ is a divalent hydrocarbon radical, and preferably a linear hydrocarbon of the formula —$(CH_2)_n$—, where n is greater than, or equal to, 2, and preferably n is from 2 to 10, more preferably from 2 to 8, and even more preferably from 2 to 6. $R_2$ is a monovalent hydrocarbon radical containing at least 2 carbon atoms, and optionally may be substituted with a heteroatom containing group, such as OH or SH. Preferably $R_2$ a linear hydrocarbon of the formula —$(CH_2)_n$—$CH_3$, where n is from 1 to ten, and preferably n is from 1 to 9, more preferably from 1 to 7, and even more preferably from 1 to 5.

Additional primary-secondary diamines include, but are not limited to, N-ethylethylenediamine, N-phenylethylenediamine, N-phenyl-1,2-phenylenediamine, N-phenyl-1,4-phenylenediamine, and N-(2-hydroxyethyl)-ethylenediamine, 1,2-diamino-2-methyl-propane. Exemplary primary-secondary diamines are shown below.

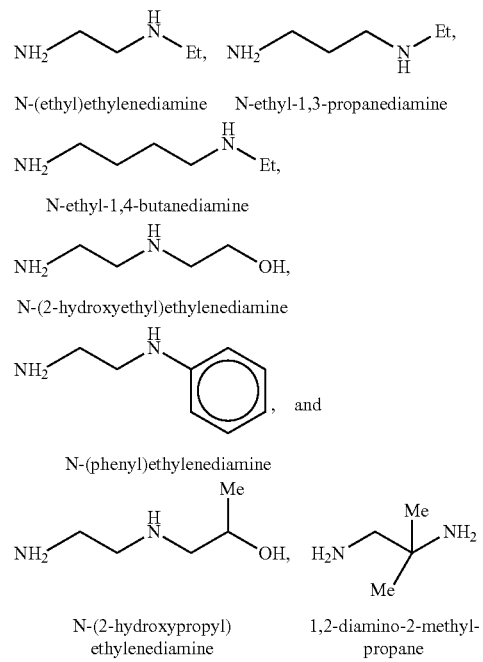

The alkanolamine is a compound containing an amine group and at least one hydroxyl group, preferably only one hydroxyl group. The amine can be a primary or a secondary amine, and is preferably a primary amine. The polyamine is a compound that contains at least two amine groups, preferably only two amine groups.

Suitable alkanolamines are those of structure (II) below:

$$H_2N-R_1-OH \qquad (II)$$

In structure (II), $R_1$ is a divalent hydrocarbon radical, and preferably a linear hydrocarbon of the formula —$(CH_2)_n$—, where n is greater than, or equal to, 2, and preferably n is from 2 to 10, more preferably from 2 to 8, and even more preferably from 2 to 6.

Additional alkanolamines include, but are not limited to, ethanolamine, 2-amino-1-propanol, 3-amino-1-propanol, 2-amino-1-butanol and 2-aminobenzyl alcohol.

Exemplary alkanolamines are shown below.

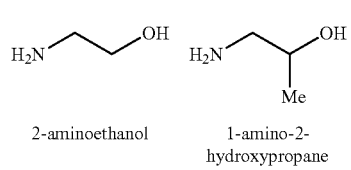

2-aminoethanol     1-amino-2-hydroxypropane

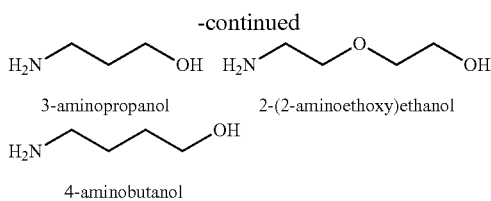

3-aminopropanol    2-(2-aminoethoxy)ethanol 4-aminobutanol

Additional examples of suitable alkanolamines and suitable diamines, are represented by the following formula (III):

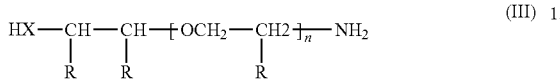

(III)

In formula (III), X is O, or X=NR' (R'=alkyl); and each R is independently H, CH$_3$, or CH$_2$CH$_3$; and n is from 0 to 50. The disclosure and preparation of hydroxylamines can be found in U.S. Pat. Nos. 3,231,619; 4,612,335; and 4,888,446; the teachings of which are incorporated herein by reference. Exemplary alkanolamines include 2-aminoethanol, 1-amino-2-propanol, 2-amino-1-propanol, 3-amino-1-propanol, 2-(2-aminoethoxy)ethanol, 1-amino-2-butanol, 2-amino-3-butanol, and polyoxyalkylene glycol amines. An exemplary alkanolamine is 2-aminoethanol.

In one embodiment, a maleic anhydride polyolefin is functionalized with a primary-secondary diamine or with an alkanolamine.

In a further embodiment, the level of maleic anhydride used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted polyolefin.

In a further embodiment, the level of peroxide used, is from 0.01 weight percent to 0.5 weight percent, preferably from 0.05 weight percent to 0.3 weight percent, and more preferably from 0.1 weight percent to 0.2 weight percent, based on the weight of the unfunctionalized grafted polyolefin.

In yet a further embodiment, the level of primary-secondary diamine or alkanolamine used, is from 1 to 10 mole equivalents, preferably from 2 to 8 mole equivalents, and more preferably from 4 to 6 mole equivalents of amine, relative to grafted anhydride.

II. In-Situ Functionalization Reactions Using Maleamic Acid to Produce the First Functionalized Polyolefin Hydroxy- and amino-functionalized polyolefin can also be prepared in one step by peroxide-initiated grafting of the corresponding maleamic acids, or derivative thereof, which is formed by reaction of maleic anhydride and alkanolamine or primary-secondary diamine.

Maleamic acids are shown in Structure (IV) below:

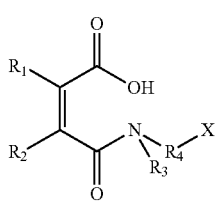

(IV)

In structure (IV), R$_1$ and R$_2$ are, independently, either hydrogen or a C$_1$-C$_{20}$ hydrocarbyl radical, which is linear or branched; R$_3$ is hydrogen or a C$_1$-C$_{20}$ hydrocarbyl radical, which is linear or branched; R$_4$ is a hydrocarbyl di-radical, which is linear or branched; X is OH or NHR$_5$, where R$_5$ is a hydrocarbyl radical, which linear or branched, or a hydroxyethyl group. In a preferred embodiment, R$_1$ and R$_2$ are, independently, either hydrogen, or a C$_1$-C$_{10}$, preferably a C$_1$-C$_8$, and more preferably a C$_1$-C$_6$, hydrocarbyl radical, which is linear or branched. In a preferred embodiment, R$_3$ is either hydrogen, or a C$_1$-C$_{10}$, preferably a C$_1$-C$_8$, and more preferably a C$_1$-C$_6$, hydrocarbyl radical, which is linear or branched. In a preferred embodiment, R$_4$ is a C$_1$-C$_{20}$, preferably a C$_1$-C$_{10}$, and more preferably a C$_1$-C$_8$, and even more preferably a C$_1$-C$_6$ hydrocarbyl radical, which is linear or branched.

In a preferred embodiment, R$_5$ is a C$_1$-C$_{20}$, preferably a C$_1$-C$_{10}$, and more preferably a C$_1$-C$_8$, and even more preferably a C$_1$-C$_6$ hydrocarbyl radical, which is linear or branched. In another embodiment, R$_5$ is a linear —(CH$_2$)$_n$—CH$_3$, where n is greater than, or equal to 1, and preferably n is from 1 to 9, more preferably from 1 to 7, and even more preferably from 1 to 5. Additional examples of R$_5$, include, but are not limited to, the following structures: —CH$_3$, —CH$_2$CH$_3$, —CH$_2$CH$_2$CH$_3$, —CH$_2$CH$_2$CH$_2$CH$_3$, —CH$_2$(CH$_3$)CH$_3$, —CH$_2$(CH$_3$)CH$_2$CH$_3$, —CH$_2$CH$_2$(CH$_3$)CH$_3$, —CH$_2$(CH$_3$)CH$_2$CH$_2$CH$_3$, —CH$_2$CH$_2$(CH$_3$)CH$_2$CH$_3$, and —CH$_2$CH$_2$CH$_2$(CH$_3$)CH$_3$.

Additional exemplary maleamic acid structures are shown below. In each structure, R$_3$ and R$_4$ are defined as above.

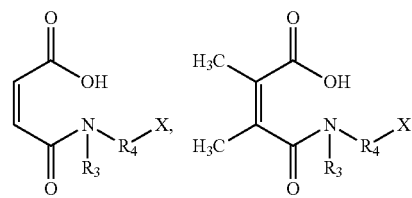

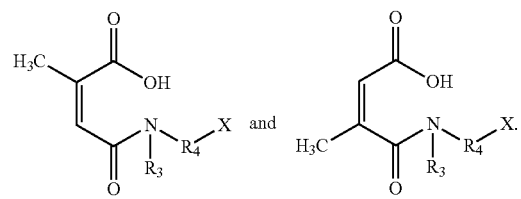

Preferably the maleamic acid, is shown in structures (V) and (V1) below:

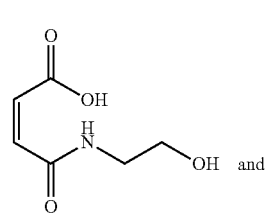

(V)

and

-continued (VI)

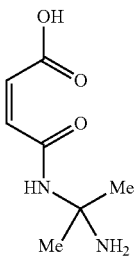

The polyolefin is functionalized with a maleamic acid as shown in structures (V) or (VI). In one embodiment, the level of maleamic acid used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted polyolefin.

In a further embodiment, the level of peroxide used, is from 0.01 weight percent to 1 weight percent, preferably from 0.01 weight percent to 0.5 weight percent, and more preferably from 0.05 weight percent to 0.3 weight percent, and even more preferably from 0.1 weight percent to 0.2 weight percent, based on the amount of unfunctionalized grafted polyolefin.

III. Diamine Imbibe Process to Produce the First Functionalized Polyolefin

The polyolefins as described herein may also be functionalized using a diamine imbibing process. Here, a polyolefin is first functionalized with a group reactive with amine functionality. Preferably, the polyolefin is functionalized with an anhydride group. At least one diamine is mixed with the functionalized polyolefin at a temperature below the melting point of the polyolefin, and preferably at room temperature. The diamine is allowed to absorb or imbibe into the polyolefin, and reacts with diamine reactive group to form a succinamic acid. The reaction of the diamine with the diamine reactive functional group to form the imide ring, can then be completed by subjecting the mixture to a thermal treatment, such as in a melt extrusion process. Suitable diamines include those diamines discussed herein. The imbibing process helps to ensure that the diamine is thoroughly mixed with the polyolefin for an efficient functionalization reaction.

Suitable primary-secondary diamines include compounds of structure (VI) below:

(VI)

In structure (VI), $R_1$ is a divalent hydrocarbon radical, and preferably a linear hydrocarbon of the formula $—(CH_2)_n—$, where n is greater than, or equal to, 2, and preferably n is from 2 to 10, more preferably from 2 to 8, and even more preferably from 2 to 6. $R_2$ is a monovalent hydrocarbon radical containing at least 1 carbon atom, and optionally may be substituted with a heteroatom containing group, such as OH or SH. Preferably $R_2$ a linear hydrocarbon of the formula $—(CH_2)_n—CH_3$, where n is from 0 to ten, and preferably n is from 0 to 9, more preferably from 0 to 7, and even more preferably from 0 to 5.

Suitable primary-secondary diamines include, but are not limited to, N-methyl-ethylenediamine, N-ethylethylenediamine, N-phenylethylenediamine, N-methyl-1,3-propanediamine, N-methylethylenediamine, N-phenyl-1,2-phenylenediamine, N-phenyl-1,4-phenylenediamine, 1-(2-aminoethyl)-piperazine, 1,2-diamino-2-methyl-propane and N-(2-hydroxyethyl)-ethylenediamine. Exemplary primary-secondary diamines are shown below.

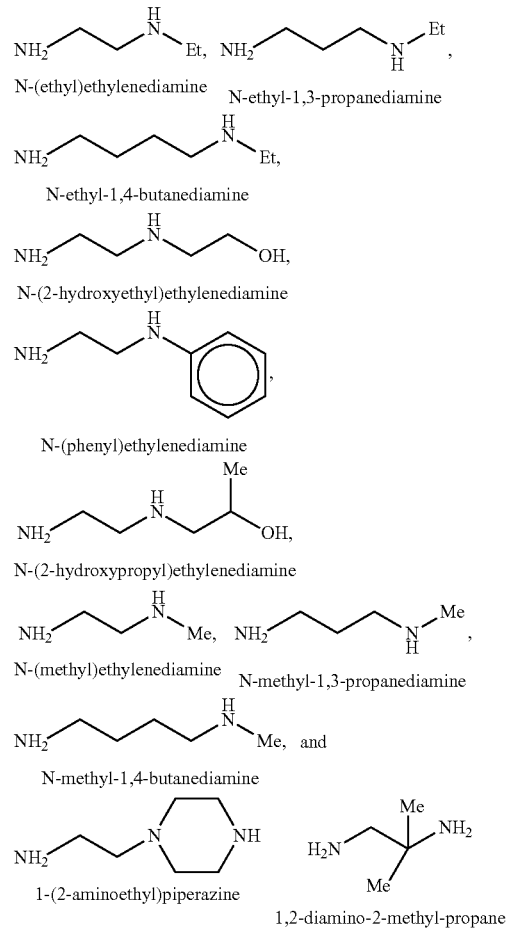

IV. In-Situ Functionalization Reactions Using 2,2,6,6-Tetramethylpiperidine-N-Hydroxyl and Derivatives Thereof to Produce the First Functionalized Polyolefin Functionalized 2,2,6,6-tetramethylpiperidine-N-hydroxyl and/or derivatives thereof such as 4-Hydroxy-TEMPO may be used to prepare the first functionalized polyolefin via for example reactive melt blending equipment such as Banbury-type batch mixers, twin screw extruder's, single screw extruder, Buss-kneaders, twin screw continuous kneaders; or in the alternative, the reaction may take place in solution.

The functionalization reaction may be a one step process in the presence of peroxide, or in the alternative, the functionalization reaction process may comprise two or more steps. For example, in the first step, polymer is melt blended with functionalized 2,2,6,6-tetramethylpiperidine-N-hydroxyl and/or derivatives thereof such as 4-Hydroxy-TEMPO, and subsequently, in the 2nd step, additional functionalized 2,2,6,6-tetramethylpiperidine-N-hydroxyl and/or derivatives thereof such as 4-Hydroxy-TEMPO and peroxide are further melt blended into melt blended product of steps 1. Exemplary peroxides include, but are not limited to, organic peroxides such as a,a'-bis(t-butylperoxy)diisopropylbenzene, which is commercially available under the tradename Luperox F/Perkadox 14-40; 2,5-dimethyl-2,5-di(t-butylperoxy)hexane, which is commercially available under the tradename Luperox 101/Trigonox 101; 2,5-dimethyl-2,5-di(t-butylperoxy)-3-hexyne, which is commercially available under the tradename Luperox 130/Trigonox 145; and dicumyl peroxide, which is commercially available under the tradename Luperox DC.

V. Polyolefin Polymers Used as Base Polymer in the Grafting and Functionalization Reactions to Produce the First Functionalized Polyolefin Examples of polyolefins include high density polyethylene (HDPE), low density polyethylene (LDPE), linear low density polyethylene (LLDPE), linear ethylene/α-olefin interpolymers, or substantially linear ethylene/α-olefin interpolymers.

Suitable polyolefin also include polypropylene homopolymers and propylene copolymers, and other polyolefins, such as those formed from one or more $C_4$-$C_{20}$ alpha-olefins. The polyolefins may optionally contain copolymerizable conjugated dienes, non-conjugated dienes and/or vinyl monomers. Such polyolefins may be crystalline, partially crystalline or amorphous.

(a) Ethylene-Base Polymers

As discussed above, suitable ethylene-base polymers include, for example, high density polyethylene (HDPE), linear low density polyethylene (LLDPE), ultra low density polyethylene (ULDPE), homogeneously branched linear ethylene polymers, and homogeneously branched substantially linear ethylene polymers (that is homogeneously branched long chain branched ethylene polymers).

High density polyethylene (HDPE), useful as a polyolefin resin, typically has a density of about 0.94 to about 0.97 g/cc. Commercial examples of HDPE are readily available in the market. Other suitable ethylene polymers include low density polyethylene (LDPE), linear low density polyethylene (LLDPE), and linear very low density polyethylene (VLDPE). Typically the low density polyethylene (LDPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (ULDPE), homogeneously branched linear ethylene interpolymers, or homogeneously branched substantially linear ethylene interpolymer, typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the $C_3$-$C_{20}$ α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

Overall, suitable ethylene polymers have a melt index, $I_2$, less than, or equal to, 1000 g/10 min, preferably less than, or equal to, 500 g/10 min, more preferably less than, or equal to, 100 g/10 min, most preferably less than, or equal to, 50 g/10 min, as measured in accordance with ASTM 1238, Condition 190° C./2.16 kg.

Commercial examples of suitable ethylene-base interpolymers include ATTANE™, AFFINITY™, DOWLEX™, ELITE™, all available from The Dow Chemical Company; and EXCEED™ and EXAC™ available from Exxon Chemical Company.

The terms "homogeneous" and "homogeneously-branched" are used in reference to an ethylene/α-olefin interpolymer, in which the α-olefin comonomer is randomly distributed within a given polymer molecule, and substantially all of the polymer molecules have the same ethylene-to-comonomer ratio. The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein incorporated by reference. The substantially linear ethylene interpolymers are those in which the comonomer is randomly distributed within a given interpolymer molecule, and in which substantially all of the interpolymer molecules have the same ethylene/comonomer ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons (including both backbone and branch carbons) to 3 long chain branches per 1000 total carbons. The length of a long chain branch is longer than the carbon length of a short chain branch formed from the incorporation of one comonomer into the polymer backbone.

Some polymers may be substituted with 0.01 long chain branches per 1000 total carbons to 1 long chain branch per 1000 total carbons, or from 0.05 long chain branches per 1000 total carbons to 1 long chain branch per 1000 total carbons, or from 0.3 long chain branches per 1000 total carbons to 1 long chain branch per 1000 total carbons. Commercial examples of substantially linear polymers include the ENGAGE™ polymers and AFFINITY™ polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution ($M_w/M_n$ or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17,1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 total carbons.

The homogeneous branched ethylene polymers useful in the present invention will preferably have a single melting peak, as measured using differential scanning calorimetry (DSC), in contrast to heterogeneously branched linear ethylene polymers, which have 2 or more melting peaks, due to the heterogeneously branched polymer's broad branching distribution.

Homogeneously branched linear ethylene interpolymers are a known class of polymers which have a linear polymer backbone, no measurable long chain branching and a narrow molecular weight distribution. Such polymers are interpolymers of ethylene and at least one α-olefin comonomer of from 3 to 20 carbon atoms, and are preferably copolymers of ethylene with a $C_3$-$C_{20}$ a-olefin, and are more preferably copolymers of ethylene with propylene, 1-butene, 1-pentene, 1-hexene, 1-heptene or 1-octene, and even more preferably, propylene, 1-butene, 1-hexene or 1-octene.

This class of polymers is disclosed for example, by Elston in U.S. Pat. No. 3,645,992, and subsequent processes to produce such polymers using metallocene catalysts have been developed, as shown, for example, in EP 0 129 368, EP 0 260 999, U.S. Pat. Nos. 4,701,432; 4,937,301; 4,935,397; 5,055,438; and WO 90/07526, and others. The polymers can be made by conventional polymerization processes (for example, gas phase, slurry, solution, and high pressure).

In a preferred embodiment of the invention, an ethylene-based interpolymer is used as the base polymer in the grafting reaction. In a further embodiment, the ethylene-based interpolymer is an ethylene/α-olefin interpolymer, comprising at least one α-olefin. In another embodiment, the interpolymer further comprises at least one diene.

In one embodiment, the ethylene/α-olefin interpolymer has a molecular weight distribution ($M_w/M_n$) less than, or equal to, 10, and preferably less than, or equal to, 5. More preferably the ethylene/α-olefin polymers have a molecular weight distribution from 1.1 to 5, and more preferably from about 1.5 to 4. All individual values and subranges from about 1 to 5 are included herein and disclosed herein.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ α-olefin. Preferred comonomers include propene, 1-butene, 1-pentene, 1-hexene, 1-heptene and 1-octene, and more preferably include propene, 1-butene, 1-hexene and 1-octene.

Illustrative α-olefins include propylene, 1-butene, 1-pentene, 1-hexene, 4-methyl-1-pentene, 1-heptene, 1-octene, 1-nonene and 1-decene. The α-olefin is desirably a C3-C10 α-olefin. Preferably, the α-olefin is propylene, 1-butene, 1-hexene or 1-octene. Illustrative interpolymers include ethylene/propylene (EP) copolymers, ethylene/butene (EB) copolymers, ethylene/hexene (EH) copolymers, ethylene/octene (EO) copolymers, ethylene/α-olefin/diene modified (EAODM) interpolymers, such as ethylene/propylene/diene modified (EPDM) interpolymers and ethylene/propylene/octene terpolymers. Preferred copolymers include EP, EB, EH and EO polymers.

Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

In another embodiment, the ethylene/α-olefin interpolymer has a melt index ($I_2$) from 0.01 g/10 min to 1000 g/10 min, preferably from 0.01 g/10 min to 500 g/10 min, and more preferably from 0.01 g/10 min to 100 g/10 min, as determined using ASTM D-1238 (190° C., 2.16 kg load). All individual values and subranges from 0.01 g/10 min to 1000 g/10 min are includes herein and disclosed herein.

In another embodiment, the ethylene/α-olefin interpolymer has a percent crystallinity of less than, or equal to, 60 percent, preferably less than, or equal to, 50 percent, and more preferably less than, or equal to, 40 percent, as measured by DSC. Preferably, these polymers have a percent crystallinity from 2 percent to 60 percent, including all individual values and subranges from 2 percent to 60 percent. Such individual values and subranges are disclosed herein.

In another embodiment, the ethylene/α-olefin interpolymer has a density less than, or equal to, 0.93 g/cc, preferably less than, or equal to, 0.92 g/cc, and more preferably less than, or equal to, 0.91 g/cc. In another embodiment, the ethylene/α-olefin interpolymer has a density greater than, or equal to, 0.85 g/cc, preferably greater than, or equal to, 0.86 g/cc, and more preferably greater than, or equal to, 0.87 g/cc.

In another embodiment, the ethylene/α-olefin interpolymer has a density from 0.85 g/cm$^3$ to 0.93 g/cm$^3$, and preferably from 0.86 g/cm$^3$ to 0.92 g/cm$^3$, and more preferably from 0.87 g/cm$^3$ to 0.91 g/cm$^3$. All individual values and subranges from 0.85 g/cm$^3$ to 0.93 g/cm$^3$ are included herein and disclosed herein.

In another embodiment, the final functionalized ethylene/α-olefin interpolymer, containing an imide functionality, has a melt index ($I_2$) from 0.01 g/10 min to 1000 g/10 min, preferably from 0.01 g/10 min to 500 g/10 min, and more preferably from 0.01 g/10 min to 100 g/10 min, as determined using ASTM D-1238 (190° C., 2.16 kg load). All individual values and subranges from 0.01 g/10 min to 1000 g/10 min are includes herein and disclosed herein.

(b) Propylene-Based Polymers

The polypropylene base polymer may be a propylene/alpha-olefin copolymer. In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of 0.1 to 200 g/10 minutes; or in the alternative, the propylene/alpha-olefin copolymer may have a melt flow rate in the range of 0.2 to 100 g/10 minutes; or in the alternative, the propylene/alpha-olefin copolymer may have a melt flow rate in the range of 0.2 to 50 g/10 minutes; or in the alternative, the propylene/alpha-olefin copolymer may have a melt flow rate in the range of 0.5 to 50 g/10 minutes; or in the alternative, the propylene/alpha-olefin copolymer may have a melt flow rate in the range of 1 to 50 g/10 minutes; or in the alternative, the propylene/alpha-olefin copolymer may have a melt flow rate in the range of 1 to 40 g/10 minutes; or in the alternative, the propylene/alpha-olefin copolymer may have a melt flow rate in the range of 1 to 30 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method, as described above. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™. In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Paten Application No. PCT/US08/082,599, each of which is incorporated herein by reference.

(c) Olefin Block Copolymers

In certain selected embodiments, olefin block copolymers, e.g., ethylene multi-block copolymer, such as those described in the International Publication No. WO2005/090427 and U.S. patent application Ser. No. 11/376,835 may be used as the polyolefin. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

(d) Polyolefin Blends

In another embodiment, a blend of two or more polyolefins is subject to functionalization reactions, such as a blend of an ethylene-base polymer, as discussed above, and a propylene-base polymer, as discussed above. In the alternative, one or more first functionalized polyolefins may further be blended and or compounded with one or more un-functionalized polymers, e.g. polyolefins as described above as base polymers.

(e) Additional Reactions and/or Blends

The amine functionalized polyolefin or hydroxyl functionalized polyolefin, as described above, may be reacted or blended with a second polymer by melt reaction, for example, in a Brabender mixer or an extruder. This may be conducted in the same reactor as the functionalization reaction, or subsequently, in another melt reactor. The reaction time and temperature will depend on the polymers present. Thus, for example, amine functionalized polypropylene (amino-PP) may be melt reacted/blended with a blend of styrene-maleic acid polymer in polypropylene.

Similarly, polyolefin blends containing a polyolefin, an aminated polyolefin and other polymer, such as an engineering thermoplastic that is reactive with, or otherwise compatible with, the aminated polyolefin, can be prepared having improved overall blend compatibility between the polyolefin, other polymer, and aminated polyolefin. In addition, the functionalized polyolefins or blends can be blended with one or more thermoplastic or thermosetting polymers.

Processing aids, such as plasticizers, can also be included in either the individual blend components or added to the final blend. These include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as Kaydol™ oil (available from and a registered trademark of Witco) and Shellflex™ 371 naphthenic oil (available from and a registered trademark of Shell Oil Company). Another suitable oil is Tuflo™ oil (available from and a registered trademark of Lyondell).

(f) Additives

Typically polymers and resins used in the invention are treated with one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and antiblocking agents.

(2) Second Functionalized Polyolefin

The adhesion promoter system may optionally comprise from less than 40 percent by weight of the units derived from a second functionalized polyolefin, based on the total weight of the solid content; for example, less than 30 weight percent; or in the alternative, less than 20 weight percent; or in the alternative, less than 10 weight percent. The second functionalized polyolefin comprises a polypropylene i.e. homopolymers and copolymers of polypropylene and one or more alpha olefins such as ethylene, hexene, and octene, with high amounts of succinic anhydride attached which does not materially affect the physical properties of the polypropylene, and hydrolysis derivatives thereof.

A key to the method described herein is the use of succinic terminated polypropylene formed via the ene reaction onto vinylidene terminated polypropylene. This polypropylene is often, but not exclusively, prepared by metallocene catalysis. It has been discovered that grafting maleic anhydride onto this polymer does not result in significant chain scission or polymerization. In one non-limiting embodiment the method involves heating maleic anhydride in the presence of a polypropylene that has been formed using a metallocene catalyst in such a way that a single terminal vinylidene group results on each molecule. Most commonly these metallocene polymerizations are done in the presence of hydrogen (which speeds up the polymerization and lowers the molecular weight of the polymer) which results in polymer not having the terminal vinylidene group. These saturated polymers will not work in the inventive method, and thus the polymerization of propylene in the presence of a metallocene catalyst is preferably carried out in the presence of very little or no hydrogen or other transfer agents, such as triethylsilane, and the like.

The ene reaction is shown schematically below:

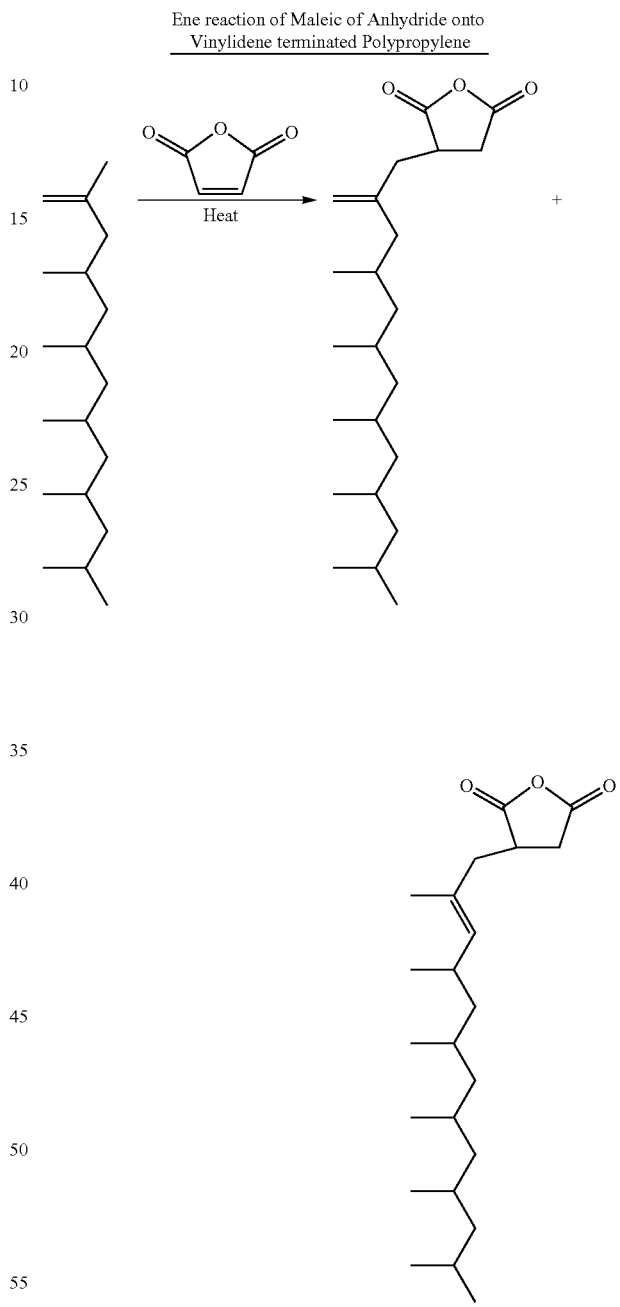

Any form of polypropylene may be used; for example syndiotactic, hemisyndiotactic, isotactic, hemiisotactic, and atactic polypropylene. The polypropylene may be made by a wide variety of transition metal catalysts.

Additional grafting of more maleic anhydride onto the above grafted polymers does not essentially effect the double bonds. All of the maleic anhydride is added to the backbone of the polypropylene. This is shown schematically below:

Grafting of Maleic Anhydride onto Succinic Terminated Polypropylene

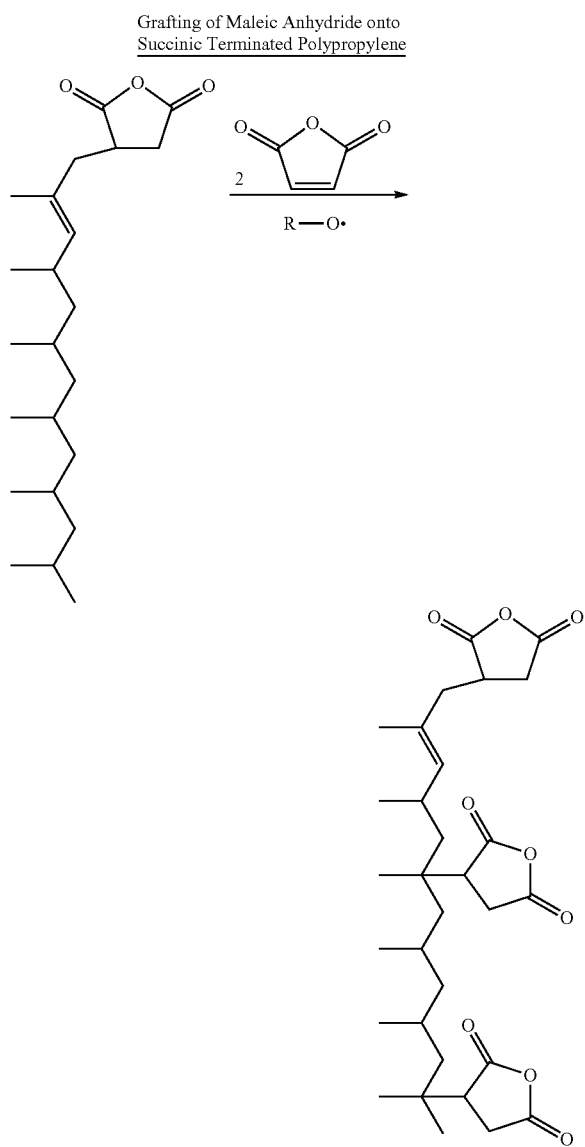

While levels of maleic anhydride incorporation below 5 weight percent are certainly possible, the described method herein facilitates the achieving of higher levels of total maleic anhydride incorporation, on the order of about 5 to about 45 weight percent, alternatively from about 10 to about 45 weight percent.

In one non-limiting embodiment of process, in the ene reaction, one molar equivalent of polypropylene (having a terminal unsaturation) is reacted with about one molar equivalent of maleic anhydride. Heating is applied, but this is generally simply enough necessary to make the polypropylene molten so that the reactants may be mixed.

In another non-restrictive embodiment of the process, in the further addition of maleic anhydride, the polypropylene having a terminal succinic anhydride moiety and a single unsaturation from the ene reaction is combined with additional maleic anhydride in the presence of free radical initiation. The free radical initiation may be any of the commonly used forms of free radical initiation including, but not necessarily limited to, peroxides, photoinitiation through ultraviolet radiation, gamma radiation, metal complexes and combinations thereof. In one non-limiting embodiment of the invention, the peroxide initiator is di-t-butyl peroxide.

When the further addition of maleic anhydride is performed neat, it is necessary to heat the mixture to at least a molten state to permit mixing of the reactants. The reaction temperature will depend on the radical source and polymer melting point and may range from about 60° C. to about 200° C. Both steps of the process may be conducted at ambient pressure. Since maleic anhydride is volatile at higher temperatures, the reaction may be conducted in a sealed vessel.

In another non-restrictive embodiment of the process, the polypropylene having a terminal succinic anhydride moiety and a single unsaturation may be dissolved in a solvent and the heating during mixing may be reduced or eliminated. Suitable solvents for the polypropylene reactant include, but are not necessarily limited to, toluene, xylenes and mixtures thereof.

The molecular weight (MO of the product polypropylene substituted with maleic anhydride may range from about 500 up about 150,000 daltons, alternatively up to about 50,000 daltons, in another non-limiting embodiment up to about 10,000 daltons, and in another non-restrictive embodiment from 600 to about 5000 Daltons.

In one embodiment, the second functionalized polymer has a melting point in the range of 50 to 120° C.; for example, 50 to 120° C., or 50 to 115° C., or 50 to 110° C., or 50 to 100° C.

In one embodiment, the second functionalized polyolefin is obtained by a process comprising (a) reacting a propylene/hexene copolymer having a terminal unsaturation with maleic anhydride in a mole ratio of 1:1 to produce terminally succinic anhydride functionalized propylene/hexene copolymer having a terminal succinic anhydride moiety and a single unsaturation, and then (b) reacting the terminally succinic anhydride functionalized propylene/hexene copolymer having a terminal succinic anhydride moiety and a single unsaturation with additional maleic anhydride in the presence of free radical initiation to produce said second functionalized polyolefin, wherein said second functionalized polyolefin has a succinic anhydride substitution in the range of from 5 to 45 weight percent, based on the weight of second functionalized polyolefin.

Such functionalized polymers are further described in US patent application nos. 2006/0084764 and 2005/0203255, and U.S. Pat. No. 7,183,359, each of which is incorporated herein by reference to the extent that describes such functionalized polymers.

(3) Solvent

The adhesion promoter system further comprises a solvent. The solvent may be any solvent; for example, the solvent may an organic solvent, an inorganic solvent, combinations thereof, and mixture thereof. The adhesion promoter system of the instant invention comprises 35 to 80 percent by volume of one or more solvents, based on the total volume of the adhesion promoter system. In particular embodiments, the solvent content may be in the range of from 35 to 75; or in the alternative, from 35 to 70; or in the alternative from 45 to 60 percent by volume, based on the total volume of the adhesion promoter system. Such solvents include, but are not limited to, toluene, xylene, AROMATIC100, N-propyl propionate, N-butyl propionate, N-pentyl propionate, mixtures thereof, and combinations thereof. Such solvents are commercially available, for example from ExxonMobil under the tradename ARO- MATIC 100, and from The Dow Chemical Company under the tradename UCAR N-Alkyl Propionates.

(4) Additional Components

The adhesion promoter system according to the present invention may further comprise optionally one or more binder compositions such as thermoplastic acrylates, available under the tradename PARALOID from The Dow Chemical Company, such as B48N or B99 or polyesters, e.g. OH containing polyesters, available under the tradename Desmophen from Bayer or Polyisocyantes, e.g. aromatic, available under the tradename Desmodur from Bayer; optionally one or more additives; optionally one or more fillers and pigments, e.g. titanium dioxide, mica, calcium carbonate, silica, zinc oxide, milled glass, aluminum trihydrate, talc, antimony trioxide, fly ash, and clay; optionally one or more conductive fillers like carbon black; optionally one or more co-solvents, e.g. glycols, glycol ether, 2,2,4-trimethyl-1,3-pentanediol monoisobutyrate, alcohols, mineral spirits, and benzoate esters; optionally one or more surfactants; optionally one or more defoamers; optionally one or more preservatives, e.g. biocides, mildewcides, fungicides, algaecides, and combinations thereof; optionally one or more rheology modifiers, optionally one or more neutralizers e.g. hydroxides, amines, ammonia, and carbonates.

(5) Additional Colorant Components

Embodiments of the present invention may also employ a colorant as part of the adhesion promoter system. A variety of colors may be used. Examples include colors such as yellow, magenta, and cyan. As a black coloring agent, carbon black, and a coloring agent toned to black using the yellow/magenta/cyan coloring agents shown below may be used. Colorants, as used herein, include dyes, pigments, and predispersions, among others. These colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment predispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment.

Exemplary colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

Forming the Adhesion Promoter System

The adhesion promoter system according to the present invention can be formed by any number of methods recognized by those having skill in the art. In one embodiment, one or more first functionalized polyolefins, and optionally one or more second functionalized polyolefins, as described hereinabove, are dissolved in one or more solvents, as described above, for example, at a temperature in the range of from 25° C. to 120° C.

The one or more first functionalized polyolefins and optionally one or more second functionalized polyolefins may be dissolved in one or more solvents simultaneously; or in the alternative, the one or more first functionalized polyolefins and optionally one or more second functionalized polyolefins may be dissolved in one or more solvents sequentially; or in the alternative, the one or more first functionalized polyolefins and optionally one or more second functionalized polyolefins may be dissolved in one or more solvents in series or in parallel and then brought together. In an alternative embodiment, the one or more first functionalized polyolefins and optionally one or more second functionalized polyolefins may be compounded optionally in the presence of peroxide and heat, and then, dissolved in one or more solvents. A process for producing the adhesion promoter system in accordance with the present invention is not particularly limited. The one or more first functionalized polyolefins or the one or more second functionalized polyolefins may be in the form of pellets, powder, or flakes.

In one embodiment, the present invention further provides a method for producing an adhesion promoter system comprising the steps of: (1) selecting at least 60 percent by weight of a first functionalized polyolefin, based on the total weight of the solid content; (2) optionally selecting less than 40 percent by weight of a second functionalized polyolefin, based on the total weight of the solid content, wherein said second functionalized polyolefin comprise homopolymers of propylene or copolymers of propylene with hexene, octene and/or other like alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 weight percent of second functionalized polyolefin; (3) admixing said first functionalized polyolefin and said optionally second functionalized polyolefin in the presence of one or more solvents, for example, at a temperature in the range of from 25° C. to 120° C.; and (4) thereby forming said adhesion promoter system.

End-Use Applications

The adhesion promoter system of the present invention may be used, for example, in different coating applications, e.g. automotive coating applications, as an adhesion promoter for certain low surface energy plastic substrates such as thermoplastic polyolefins ("TPO").

The adhesion promoter system may be applied to one or more surfaces of a substrate, an article, or a structure via any method. Such methods include, but are not limited to, spraying, dipping, rolling, printing, and any other conventional technique generally known to those skilled in the art. The adhesion promoter system may be applied to one or more surfaces of a substrate, an article, or a structure at a temperature in the range of greater than about 5° C.; for example, in the range of 25° C. to 400° C. or in the alternative, it can be used as a sizing agent for substrates such as glass fibers to produce glass fiber reinforced polypropylene or TPO, or to provide for adhesion between natural fibers and a PP or TPO substrate to enable reinforcement. Such substrates include, but are not limited to, thermoplastic polyolefins ("TPO"), and glass fiber reinforced polypropylene substrate or natural fiber reinforced PP or TPO. The inventive adhesion promoter system may be used as adhesion promoting layer for auto interior applications such as instrument panel, auto exterior applications such as bumpers, or other non automotive applications such as in packaging, toys, leisure, aquaculture, geotextiles, sporting goods, appliances, consumer electronics, furniture, marine, roofing membranes and toys.

Such coated substrates may further be coated with other topcoat systems.

The inventive adhesion promoter system is applied to one or more surfaces of a substrate, an article, or a structure, and then a topcoat is applied. The topcoat may be applied after an intermediate baking step, i.e. removing at least a portion of the solvent; or in the alternative, the topcoat may be applied without the intermediate baking step. In the alternative, the inventive adhesion promoter system is applied to one or more surfaces of a substrate, an article, or a structure, and then at least a portion of the solvent is removed before a topcoat is applied. A clear coat may further be applied after the topcoat is at least partially dried. In the alternative, the adhesion promoter system may be admixed with a topcoat, and then, the admixture may be applied to one or more surfaces of a substrate, an article, or a structure.

In one embodiment, the adhesion promoter system forms an adhesion layer, i.e. a film, which is associated with one or more surfaces of a substrate, an article, or a structure. The adhesion layer may have a thickness in the range of 1 to 30 µm; for example 5 to 15 µm.

In another alternative embodiment, a multilayer structure comprises: (a) at least one or more substrate layers; (b) at least one or more adhesion layers, wherein said one or more adhesion layers comprise a film derived from the adhesion promoter system; (c) at least one or more outer layers; wherein said adhesion layer is disposed therebetween said one or more substrate layers and said one or more outer layers.

In another alternative embodiment, a process for making a multilayer structure according to the present invention comprises the steps: (1) selecting a at least one or more substrate layers; (2) selecting the adhesion promoter system; (3) applying said adhesion promoter system to at least one surface of said substrate layer; (4) removing at least a portion of the solvent; (5) thereby forming an adhesion layer associated with said substrate layer; (6) forming at least one or more outer layers on said adhesion layer; and (7) thereby forming a multilayer structure.

In another alternative embodiment, the instant invention further provides a coating formulation comprising at least the adhesion promoter system, as described hereinabove.

In another alternative embodiment, the instant invention further provides a coating layer comprising a film derived from the coating formulation, as described hereinabove.

In another alternative embodiment, the instant invention further provides a multilayer structure comprising: (a) at least one or more substrate layers; (b) at least one or more coating layers comprising a film derived from the coating formulation, as described hereinabove; and (c) optionally one or more outer layers.

In another alternative embodiment, the instant invention further provides a process for making a multilayer structure comprising the steps: (1) selecting at least one or more substrate layers; (2) selecting the adhesion promoter system, as described hereinabove; (3) applying said adhesion promoter system to at least one surface of said substrate layer; (4) removing at least a portion of the solvent; (5) thereby forming an adhesion layer associated with said substrate layer; (6) forming at least one or more outer layers on said adhesion layer; and (7) thereby forming a multilayer structure.

In another alternative embodiment, the instant invention further provides a process for making a multilayer structure comprising the steps: (1) selecting at least one or more substrate layers; (2) selecting a coating formulation, as described hereinabove; (3) applying said coating formulation to at least one surface of said substrate layer; (4) removing at least a portion of the solvent; (5) thereby forming a coating layer associated with said substrate layer; (6) optionally forming one or more outer layers on said coating layer; and (7) thereby forming a multilayer structure.

EXAMPLES

The following examples illustrate the present invention but are not intended to limit the scope of the invention.

(I) OH-TEMPO Functionalization

Preparation of the First Functionalized Polyolefin:

First functionalized polyolefins were prepared via a Thermo Haake Rheomix 3000, fitted with Banbury rotors. For each run, 250 g of VERSIFY™ (various grades as shown in Table 1) (propylene ethylene copolymer), commercially available from The Dow Chemical Company, was introduced into the preheated 379 $cm^3$ mixing chamber and was heated and mixed at 170° C. and 30 RPM, respectively, to obtain a polymer melt. Various amounts of OH-TEMPO (2,2,6,6-TETRAMETHYL-4-HYDROXY-1-PIPERIDINY-LOXY) available from A. H. Marks and peroxide Perkadox 14-40 (1,4-Bis(2-tert-butylperoxyisopropyl)benzene; 40% active) available from Akzo Nobel were added in steps of 1 wt % OH-TEMPO and corresponding peroxide amount until the desired weight percent of OH-TEMPO was obtained.

After the polymer melt (250 g) reached the required processing temperature, the first addition of OH-TEMPO was made (2.5 g, 14.5 mmol). The nitroxide mixed in at 30 rpm for one minute, followed by the addition of the corresponding amount of Perkadox 14-40B-PD (4.10 g, 40 wt % on a whiting carrier, i.e. 1.64 g of active species, 4.85 mmol). Mixing was continued for 6 minutes, after which the second addition of 1 weight percent of OH-TEMPO and the corresponding peroxide amount was added. This procedure was repeated until 6 wt % of OH-TEMPO (and the corresponding amount of peroxide) was added to the polymer. After the final addition, the mixture was mixed for 30 minutes at 170° C., before it was cooled to approximately 130° C., and then it was discharged from the mixer.

Blank samples (comparative examples) were prepared for all VERSIFY™ grades. For the Blank samples, VERSIFY™ polymer was mixed at 170° C. and 30 RPM for 30 minutes without the addition of any functionalizing agents or peroxide.

Coating Application:

Fist functionalized polyolefins and Blank samples, as described above, were dissolved in p-xylene (2 g/20 mL). Subsequently, a doctor blade was used to apply a wet film of 75 µm thickness to a TPO substrate. The coating was left at room temperature to flash off, followed by a heat treatment at 110° C. (oven temperature, sample temperature: approximately 100° C.) for 30 minutes. Then, the topcoat (silver color with a solid content of approximately 37.0 wt %) was applied via a doctor blade (75 µm wet film thickness). Upon flash off, this next layer was dried at 90° C. for 15 minutes.

Finally, a clear coat (solid content of approximately 52.5 wt %) was applied (75 μm wet film thickness) and then dried at 90° C. for 30 minutes.

Various grades of propylene ethylene copolymers (various ethylene content and/or melt flow rate (MFR) measured at 230° C. and 2.16 kg, and/or molecular weights), under the tradename VERSIFY™, commercially available from The Dow Chemical Company, were functionalized with 4-hydroxy-TEMPO (also referred to as OH-TEMPO), as shown in Table 1A.

Influence of 4-Hydroxy Content

Figures 2, 3:
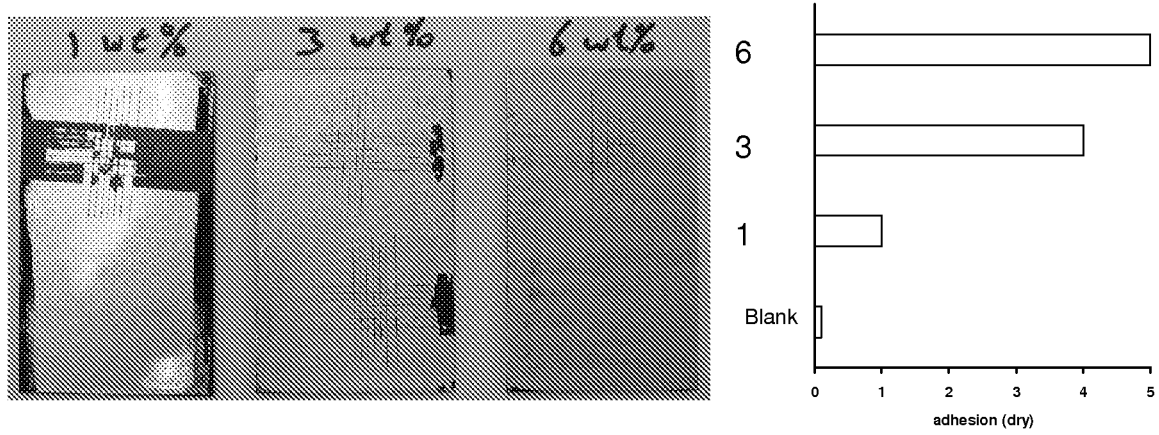
FIGS. 2 & 3 illustrates the adhesion performance of functionalized propylene-co-ethylene polymers at different levels of OH-TEMPO.

The first functionalized polyolefins samples, i.e. functionalized VERSIFY™ samples, as described above, were dissolved in p-xylene to obtain 10-12 wt % solution and applied as adhesion promoters onto TPO substrates, before applying the acrylic topcoat and 2 component polyurethane clear coat systems. The topcoat is a metallic, silver colored paint. Adhesion was evaluated by the cross-hatch adhesion test (dry or after water immersion), where a score of 5 is the best performance and 0 is the worst score. Damage to the coating system could be easily observed due to the large contrast in color between the silver colored topcoat and the underlying black TPO substrate. Furthermore it was found that, if failure occurred, it occurred at the adhesion promoter/topcoat interface. The adhesion between the TPO and the VERSIFY™-based adhesion promoters was found to be excellent, as was verified by separate adhesion tests. Application of the topcoat directly onto TPO without an adhesion promoter results in very poor adhesion, the topcoat film can be easily peeled off the substrate. Also, using non-functionalized VERSIFY™ as an adhesion promoter does not improve adhesion to an appreciable extent. FIGS. 2 and 3 show the adhesion performance of functionalized VERSIFY™ 3300 at different levels of OH-TEMPO content.

Influence of Ethylene Content

Figure 4:
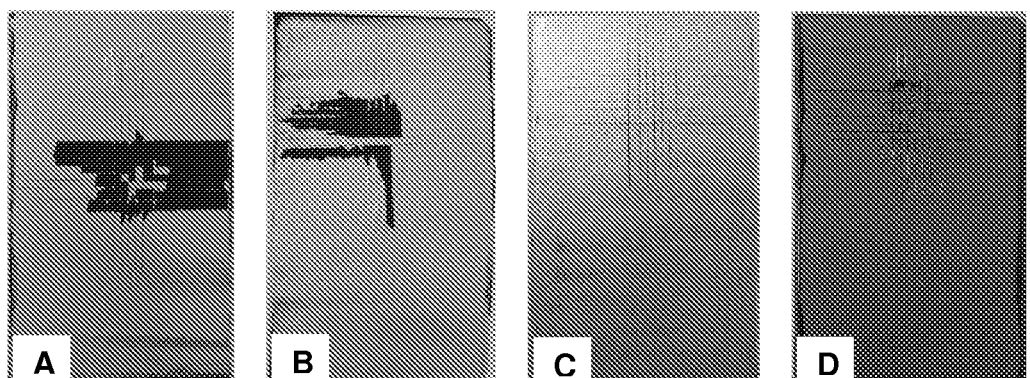
FIG. 4 illustrates the adhesion performance of different functionalized propylene-co-ethylene polymers at 6 weight percent OH-TEMPO.

The effect of ethylene content is also clearly visible in the adhesion promoting performance of the functionalized VERSIFY™ samples. With increasing ethylene content, the performance improves, as shown in FIG. 11. FIG. 4 shows the adhesion promoting performance of VERSIFY™ functionalized with 6 wt % OH-TEMPO: A) VERSIFY™ 3000, B) VERSIFY™ 3200, C) VERSIFY™ 3300, D) VERSIFY™ 3401 (containing 15-17 wt % of AFFINITY™ PL1280).

Influence of Molecular Weight

Figure 5:
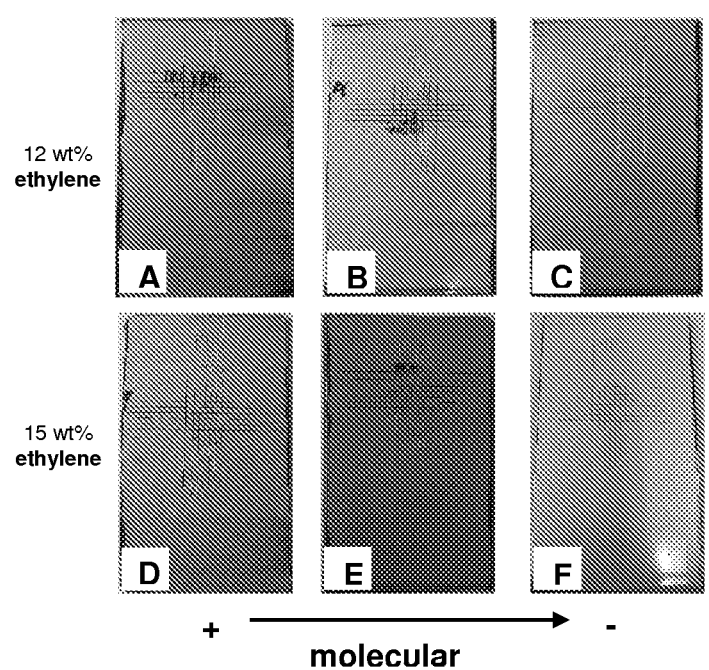
FIG. 5 illustrates the adhesion performance of functionalized propylene-co-ethylene polymers having various molecular weights.
Figure 6:
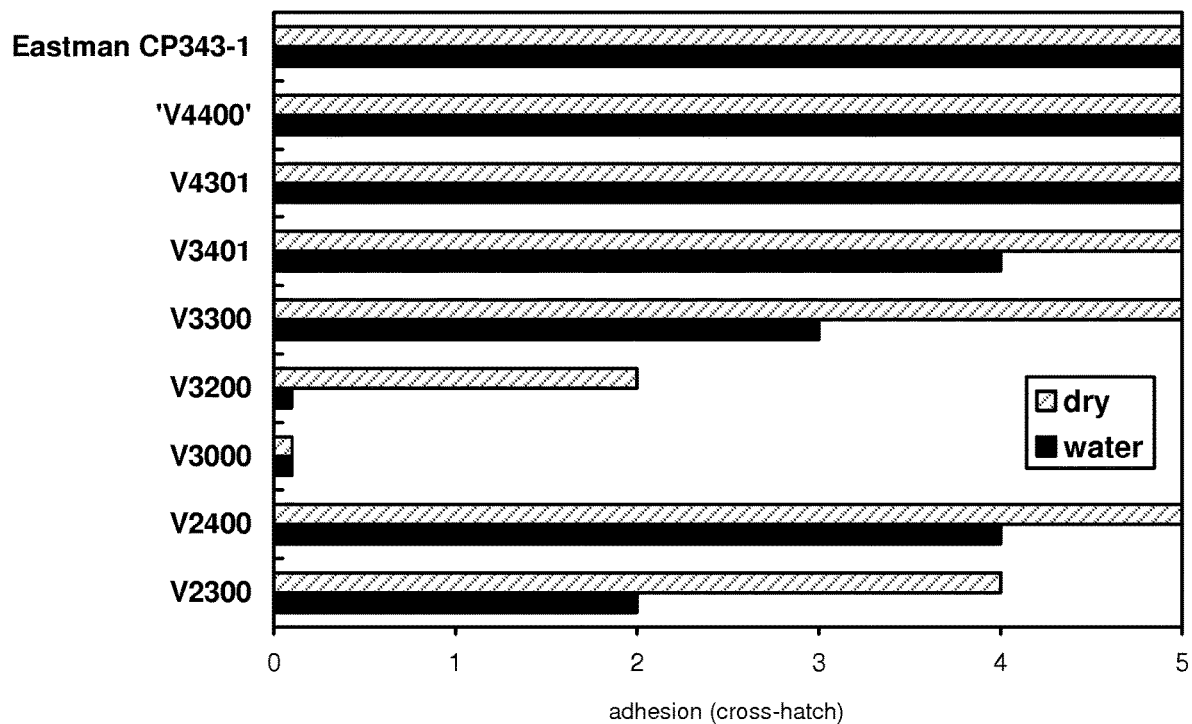
FIG. 6 summarizes the adhesion scores for various functionalized propylene-co-ethylene polymers at dry conditions and after 2 hrs of water immersion at 50° C.

Adhesion testing was carried out to determine the effect of molecular weight at two different, fixed ethylene contents of 12 wt % and 15 wt %. The results are reported in FIG. 5.

Summary of Adhesion Performance

A commercial adhesion promoter (Eastman CP343-1), was used as a standard sample. FIG. 3 summarizes the adhesion scores for the different VERSIFY™ grades functionalized with 6 wt % OH-TEMPO at dry conditions and after 2 hrs of water immersion at 50° C.

II. Maleic Anhydride Functionalization

Sample 1:

A propylene ethylene copolymer, under the tradename VERSIFY™ 2400.01, available from The Dow Chemical Company, was functionalized with maleic anhydride producing a VERSIFY™ having approximately 0.86 weight % MAH graft, 5.1-5.75 acid number.

Samples 2:

(VERSIFY™ functionalized with hydroxy)

All batches run in the small 50 ml mixing bowl of the Haake, 180° C. bowl temperature, rotor speed of approximately 100 RPM. Depending on the amine, it was added by pipette (ethanolamine) or imbibed into the resin (N-methyl-1,3-propane diamine) prior to the run. In both cases, 2 molar equivalents amine per anhydride were used; 0.5 g for the ethanolamine, 0.73 g for the N-methyl-1,3-propanediamine. The Haake was equilibrated at the desired temperature and the rotors were calibrated at speed. The material was fluxed for 7 minutes once addition was completed and it was removed and allowed to cool on thick Teflon sheet. Analysis was carried out using FT-IR to confirm conversion of the anhydride (C=O; 1790 $cm^{-1}$) to the corresponding imide (C=O; 1705 $cm^{-1}$).

Samples 2-3

(VERSIFY-g-hydroxy/VERSIFY-g-amine)

All samples were in a small 50 ml mixing bowl of the Haake mixer, at 180° C. bowl temperature, and a rotor speed of approximately 100 RPM. Depending on the amine, it was added by pipette (ethanolamine) or imbibed into the resin (N-methyl-1,3-propane diamine) prior to the run. In both cases, 2 molar equivalents amine per anhydride were used; 0.5 g for the ethanolamine, 0.73 g for the N-methyl-1,3-propanediamine. The Haake mixer was equilibrated at the desired temperature and the rotors were calibrated at speed. The material was fluxed for 7 minutes once addition was completed and it was removed and allowed to cool on a thick Teflon sheet. Analysis was carried out using FT-IR to confirm conversion of the anhydride (C=O; 1790 $cm^{-1}$) to the corresponding imide (C=O; 1705 $cm^{-1}$).

Sample 4

(VERSIFY-g-poly(EO-co-PO) [Jeffamine™ M600])

The samples were prepared via melt in a Haake mixer in a similar manner to samples 2 and 3. The Jeffamine M600 was added by pipette (4.8 g). The base resin was fluxed for about 2 minutes at temperature and speed, described above. The Jeffamine was added, and the material was fluxed for 5 more minutes, and then, 8 was removed and cooled on a thick Teflon sheet. The analytical data on the sample indicated essentially complete conversion of the anhydride to imide (FT-IR as above) and the polyalkylene oxide graft content was ~3.9 wt % (NMR).

Sample 5:

(VERSIFY-g-poly(EO-co-PO) [Jeffamine™ M1000])

45 grams of VERSIFY-g-MAH (0.89 wt % MAH) was dissolved in 400 mL of hot xylene, along with 9 grams of Jeffamine™ M1000. The reaction solution temperature was raised to reflux and approximately 100 mL of xylene was distilled over to remove water via azeotrope. The reaction was allowed to proceed at reflux overnight, and after cooling, the product was isolated by precipitation into excess methanol. After filtration, washing, and drying in vacuo overnight at 80° C., the product was characterized by proton NMR and FT-IR spectroscopy. The analytical data on the sample indicated essentially complete conversion of the anhydride to imide (FT-IR) and the polyalkylene oxide graft content was ~4.5 wt % (NMR).

Coating Application for TPO:

TPO substrates were injection molded and cut into 6×10 cm pieces. Cleaning was executed using an ultrasound bath with isopropanol for 30 min. Prior to the coating application, the substrates has been rinsed with IPA and dried.

Functionalized and non-functionalized Poly(propylene-co-ethylene) samples were dissolved in p-xylene to give a 10 wt % solution. Subsequently, a doctor blade was used to apply a wet film of 75 μm thickness. The coating was left at room temperature to flash off, followed by a heat treatment at 90° C. for 15 minutes. Subsequently, a topcoat (having a silver color and a solid content of approximately 37.0 wt %)

was applied using a Meyer rod (50 µm wet film thickness). Upon flash off, this next layer was dried at 60° C. during 30 minutes. Finally, a clear coat (having a solid content of approximately 52.5 wt %) was applied using a Meyer rod (50 µm wet film thickness) and immediately dried at 60° C. for 30 minutes. The cross hatch test was performed after 24 h for dry adhesion and after immersion in water at 50 deg C. for 2 h, in Table 1B summarizes the results.

Coating Application for Glass Fiber Reinforced Polypropylene

A series of glass fiber reinforced polypropylene (GFRPP) with glass fiber content up to 50% were coated. The substrates surface was partially abraded with sandpaper of 120 grit. Then the abrasive dust was removed and the surface was wiped with isopropanol. Then xylene solution (10 wt %) of hydroxy-functionalized and sec-amino-functionalized VERSIFY™ 2400.01 (samples 2 and 3, Table 1A) were applied using a doctor blade to form a wet film of 75 um thickness (leading to about 7.5 um dry film thickness) and after flash off at room temperature put into the oven at 90° C. for 15 min. The cross-hatch test was performed only on the applied adhesion promoter layer, no further topcoat, in order to determine substrate adhesion, after 24 h. As a comparative example, Eastman CPO 343-1 was diluted to 10% and applied in the same way. The results are shown in Table 2B.

The present invention may be embodied in other forms without departing from the spirit and the essential attributes thereof, and, accordingly, reference should be made to the appended claims, rather than to the foregoing specification, as indicating the scope of the invention.

TABLE 1A

| VERSIFY™ grade | Ethylene [wt %] | MFR [g/10 min] measured at 230° C. and 2.16 kg | $T_g$ [° C.] | Vicat [° C.] | Density [g/cm$^3$] |
| --- | --- | --- | --- | --- | --- |
| 2300 | 12 | 2 | −28 | 30 | 0.866 |
| 2400 | 15 | 2 | −31 | <20 | 0.858 |
| 3000 | 5 | 8 | −18 | 93 | 0.888 |
| 3200 | 9 | 8 | −25 | 60 | 0.876 |
| 3300 | 12 | 8 | −28 | 29 | 0.866 |
| 3401 | 15 | 8 | −31 | <20 | 0.858 |
| 4301 | 12 | 25 | −29 | 30 | 0.866 |

TABLE 2A

| Sample No. | VERSIFY™ grade | OH-TEMPO [wt %]* | MFR$^1$ [g/10 min] measured at 230° C. and 2.16 kg |
| --- | --- | --- | --- |
| 1 | DE 3300 | 0$^2$ | 3.24 |
| 2 | DE 3300 | 1 | 4.45 |
| 3 | DE 3300 | 3 | 7.92 |
| 4 | DE 3300 | 6 | 22.18 |
| 5 | DE 3401 | 0$^2$ | 3.90 |
| 6 | DE 3401 | 1 | 5.47 |
| 7 | DE 3401 | 3 | 11.54 |
| 8 | DE 3401 | 6 | 20.13 |

*feed

VERSIFY products are propylene-ethylene copolymers available from The Dow Chemical Company with a melt flow rate of 8 g/10 min at 230 C and a ethylene content of 12 wt % (DE 3300) resp. 15 wt % (DE 3401).

The 4-hydroxy TEMPO 2,2,6,6-TETRAMETHYL-4-HYDROXY-1-PIPERIDINYLOXY is available from A. H. Marks.

TABLE 1B

| Sample # | Functional Group | Grafting Level [wt %] | Adhesion |
| --- | --- | --- | --- |
| 1 | MAH* | 0.89 | 5 |
| 2 | —OH | 0.89 | 5 |
| 3 | —NHR | 0.89 | 5 |
| 4 | Jeffamine M 600 poly(EO-co-PO) | 3.9 | 5 |
| 5 | Jeffamine M 1000 poly(EO-co-PO) | 4.5 | 5 |

*MFR 86 @230 deg C.
Adhesion rating: 0—no adhesion, 5—excellent adhesion

TABLE 2B

| Substrate | Description | Sample 2 | Sample 3 | Standard Sample (Adhesion Promoter Eastman 343-1) |
| --- | --- | --- | --- | --- |
| EP 672-2 | GF-PA | 0 | 1B | 0 |
| D100 F23-F1/S | Verklebbare GF-PP | 5B | 5B | 0 |
| GM 30% Natur | GF-PP | 5B | 5B | 1-2B |
| D100 F30 | GF-PP | 5B | 5B | 1-2B |
| X140 B118/C1 | GF-PP | 4-5B | 5B | 1B |
| GM 50% MI | GF-PP | 3-4B | 4B | 0 |
| X111 F40 4/1 90° | GF-PP | 5B | 4-5B | 0 |

Adhesion rating: 0—no adhesion, 5—excellent adhesion

We claim:

1. An adhesion promoter system consisting of the admixture product of:
    at least 60 percent by weight, based on the total weight of the solid content, of a first functionalized propylene-ethylene copolymer comprising 12 to 15 percent by weight of units weight, based on the total weight of the solid content, of derived from ethylene, and from 1 to 6 percent by weight of units derived from (2,2,6,6-tetramethylpiperidin-1-yl)oxyl "(4-Hydroxy-TEMPO)";
    from 5 to less than 40 percent by weight of a second functionalized polyolefin, based on the total weight of the solid content, wherein said second functionalized polyolefin comprises homopolymers of propylene or copolymers of propylene with hexene, octene and/or other alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 weight percent of second functionalized polyolefin; and
    one or more solvents.

2. An adhesion layer comprising a film derived from the adhesion promoter system of claim 1.

3. A multilayer structure comprising:
    at least one or more substrate layers;
    at least one or more adhesion layers, wherein at least one of said at least one or more adhesion layers comprises a film derived from the adhesion promoter system of claim 1;
    at least one or more outer layers;
    wherein at least one of said at least one or more adhesion layers is disposed between at least one of said at least one or more substrate layers and at least one of said at least one or more outer layers.

4. A process for making a multilayer structure comprising the steps:
   selecting a at least one or more substrate layers;
   selecting the adhesion promoter system of claim 1;
   applying said adhesion promoter system to at least one surface of said substrate layer;
   removing at least a portion of the solvent;
   thereby forming an adhesion layer associated with said substrate layer;
   forming at least one or more outer layers on said adhesion layer; and
   thereby forming a multilayer structure.

5. A coating composition comprising the adhesion promoter system of claim 1, wherein said coating composition comprises at least 1 percent by weight of the adhesion promoter system.

6. A multilayer structure comprising:
   at least one or more substrate layers;
   at least one or more coating layers, wherein said one or more coating layers comprises a film derived from a formulated composition comprising the adhesion promoter system of claim 1 and optionally other components and additives.

7. A method for producing an adhesion promoter system consisting of the steps of:
   selecting at least 60 percent by weight, based on the total weight of the solid content, of a first functionalized propylene-ethylene copolymer comprising 12 to 15 percent by weight of units derived from ethylene, and from 1 to 6 percent by weight of units derived from (2,2,6,6-tetramethylpiperidin-1-yl)oxyl("4-Hydroxy-TEMPO");
   selecting from 5 to less than 40 percent by weight of a second functionalized polyolefin, based on the total weight of the solid content, wherein said second functionalized polyolefin comprises homopolymers of propylene or copolymers of propylene with hexene, octene and/or other alpha-olefins, the homopolymers or copolymers having a single unsaturation; a terminal succinic anhydride moiety, and additional succinic anhydride substitutions on the polypropylene backbone, where the succinic anhydride substitution ranges from about 5 to about 45 weight percent of second functionalized polyolefin; and
   admixing said first functionalized propylene-ethylene copolymer with one or more solvents; and
   thereby forming said adhesion promoter system.

* * * * *